United States Patent [19]

Palmcrantz

[11] 3,998,414

[45] Dec. 21, 1976

[54] BRIDGE FOR LOADING CRANES

[75] Inventor: Jan Birger Palmcrantz, Harmanger, Sweden

[73] Assignee: Hiab-Foco Aktiebolag, Hudiksvall, Sweden

[22] Filed: Oct. 15, 1975

[21] Appl. No.: 622,678

[30] Foreign Application Priority Data

Oct. 22, 1974 Sweden ............................ 7413273

[52] U.S. Cl. .................................. 248/2; 212/46 R

[51] Int. Cl.[2] ...................... B60S 9/00; B62C 23/62

[58] Field of Search ...................... 248/2, 7, 26, 15; 52/116; 212/46 R, 144, 145

[56] References Cited

UNITED STATES PATENTS

| | | | |
|---|---|---|---|
| 2,056,733 | 10/1936 | Neale | 248/7 |
| 3,240,353 | 3/1966 | Leavesley | 212/46 R X |
| 3,426,916 | 2/1969 | Novotny | 212/46 R |
| 3,697,024 | 10/1972 | Karl-Heinz | 248/15 |
| 3,918,742 | 11/1975 | Gaibler | 248/2 |

*Primary Examiner*—J. Franklin Foss
*Attorney, Agent, or Firm*—Newton, Hopkins & Ormsby

[57] ABSTRACT

A flexible connection between the crane base of a truck-mounted loading crane and a transverse support bridge mounted on the vehicle chassis frame, said connection comprising a support arm formed on the crane base, the free end of said arm formed as a hub into which is inserted an elastic joint member secured to said bridge, said arm end engaging with some play in a lateral groove in the bridge.

4 Claims, 3 Drawing Figures

BRIDGE FOR LOADING CRANES

BACKGROUND OF THE INVENTION

The chassis frame in trucks is constructed in a manner permitting it to turn in order to partly participate in the wheel axle movements into different angular positions and inclinations. The torsional angle of the chassis frame relative to the front and rear wheel undercarriages during vehicle operation is dependent on the nature of the road surface and may be quite considerable. When a loading crane is mounted on the truck it is necessary that the chassis frame is given a possibility to turn below the crane base which is rigid.

To meet this requirement the frame attachment on one side of the crane base is in the form of a beam extending transversely across the chassis frame in the form of a so called support bridge in which the crane base is mounted by means of a rotational hub. In addition, the crane base is rigidly attached at two points to the chassis frame side members. According to this arrangement the rotational centre of the chassis frame will, however, be positioned a considerable distance below the mounting point of the support bridge on the crane foot, which, upon turning of the chassis frame, gives a lever effect with the result that the crane base attachments in the chassis frame will be exposed to very large shearing strains.

A theoretical evaluation of the lever movement which is caused by the maximal turning of the chassis frame within the longitudinal section between the attachment points of the crane base reveals a relative movement between the support bridge and the crane base of 5 millimeters or more in each direction. The result is wear on the bridge hub. The attachment screws of the chassis frame come loose, the crane base is exposed to heavy torsional stress, and the chassis frame may be damaged.

SUMMARY OF THE INVENTION

The present invention has for its purpose to eliminate these disadvantages by designing the mounting of the crane base to the support bridge in a manner permitting a sufficiently large movement between these parts without resulting in wear or deformation.

More precisely, the invention concerns a connecting arrangement between the crane base of a truck-mounted loading crane and a transverse stay, a so-called support bridge, arranged on the vehicle chassis frame, with which bridge engages a support arm which is formed on the crane base and extends in the longitudinal direction of the vehicle. It is characteristic of the invention that in-to the free end of the support arm, which arm end is formed as a hub, is inserted a joint member which is made from rubber or some other elastic material and which is secured in the support bridge, and that said arm end engages with some clearance in a lateral groove in the support bridge.

BRIEF DESCRIPTION OF THE DRAWINGS

Further characteristics of the invention will appear from the following description with reference to the accompanying drawings, wherein.

DETAILED DESCRIPTION OF A PREFERRED EMBODIMENT

Figure 1:
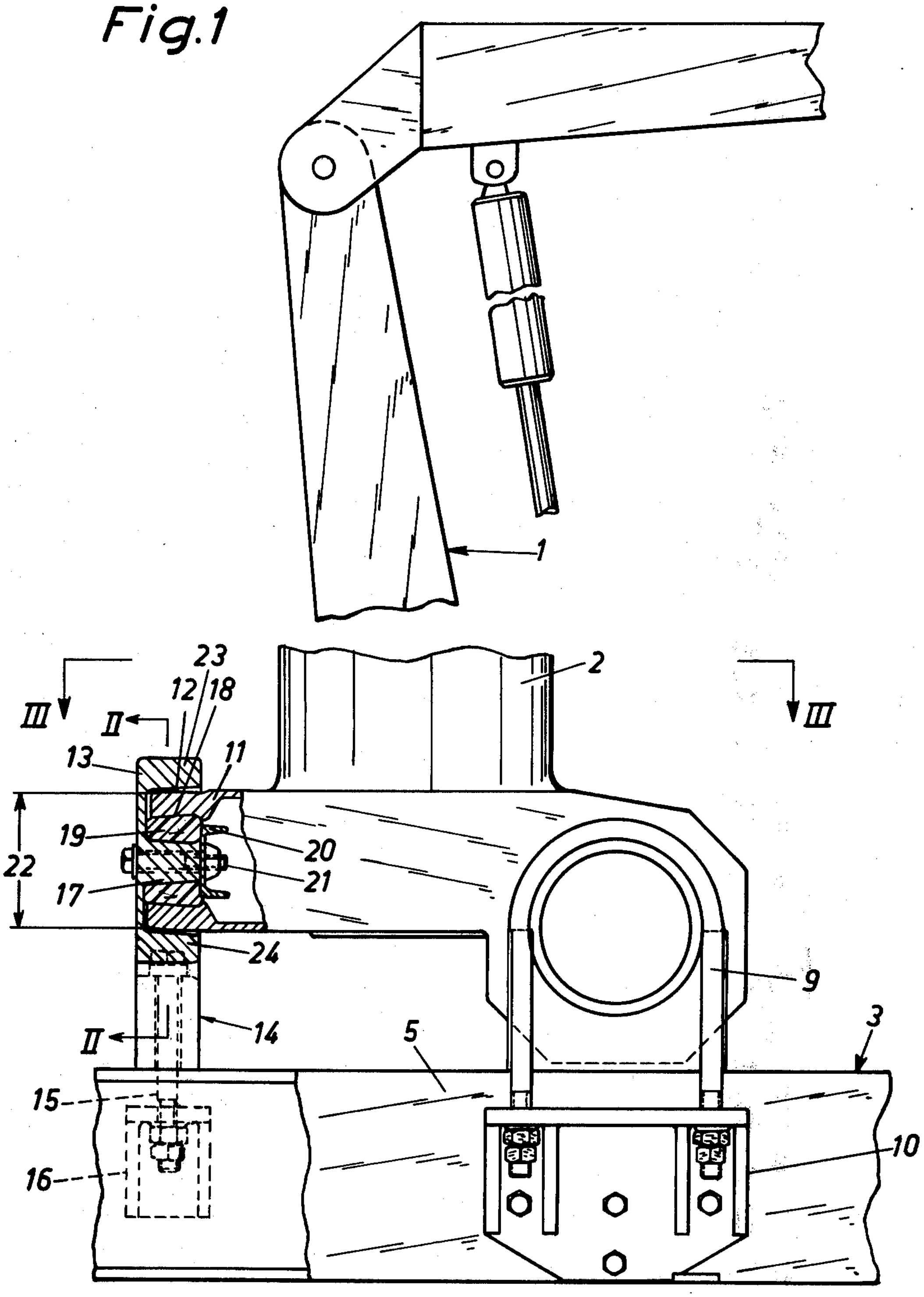
FIG. 1 is a broken side view of a loading crane mounted on a chassis frame and incorporating a connecting joint in accordance with the invention.
Figure 3:
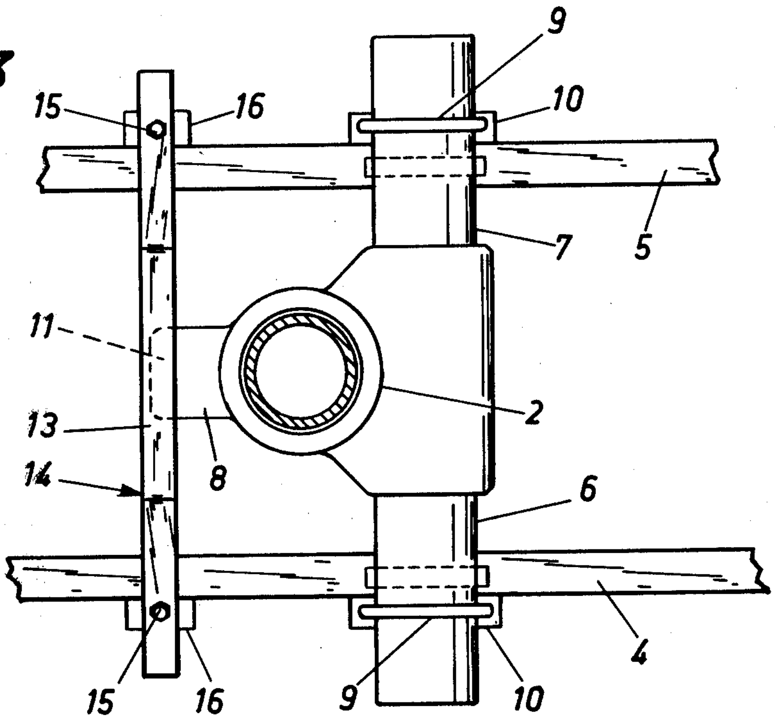
FIG. 3 illustrates on a reduced scale a cross-sectional view along line III—III of FIG. 1.
Figure 2:
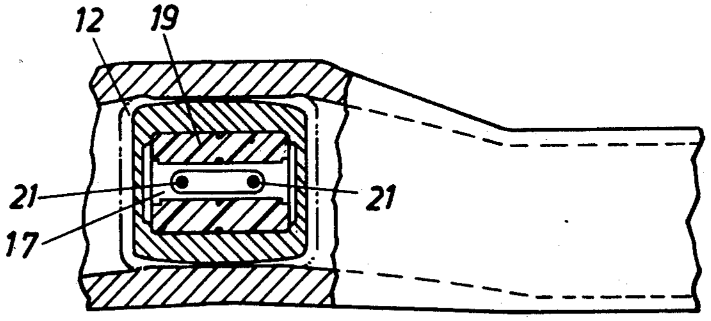
FIG. 2 illustrates a vertical section through the connecting joint along line II—II of FIG. 1.

The post 2 of the loading crane 1 illustrated in the drawings is provided with two support arms 6, 7 which extend transversely across the two longitudinal members 4, 5 of the chassis frame 3, and one support arm 8 extending in the longitudinal direction of the vehicle. Upright members 9 secure the support arms 6, 7 to brackets 10 attached to the external side of the frame members 4, 5.

The free end of the support arm 8 is in the form of a rectangular hub 11 engaging in a side groove 12 of corresponding shape formed in a raised portion 13 of a transverse stay 14, the so-called support bridge, the latter being secured to brackets 16 on the external side of the frame members 4, 5 by means of bolts 15. Intermediate a rectangular shoulder 17 formed on the bridge 14 inside the groove 12 and a centrally located, rectangularly shaped cavity 18 inside the hub 11 is inserted a joint member 19 of rubber or similar elastic material. By means of a compressing member 20 through which pass bolts 21 in a manner permitting them to be tightened, the joint member may be compressed between the shoulder 17 and the hub 11 so as to fill the cavity 18 thereof completely. The height 22 of the hub 11 is somewhat, e.g. by some millimeters, less than the distance between the upper wall 23 and lower wall 24 of the cavity 12, giving some clearance between the hub 11 and the support bridge 14. In addition, the hub is slightly cambered so as to be able to turn without touching the walls 23, 24.

When the crane load is insignificant, such as for instance during road transport when the crane is in a folded position, the shoulder 17 supports the support arm 8 via the elastic joint member 19 in such a manner that no metal to metal contact between the arm and the support bridge 14 occurs. The horizontal movement which, upon turning movement of the chassis frame, arises between the support arm 8 and the support bridge 14 is taken by shearing movements in the member 19.

On the other hand, when the crane is used for loading, support forces of such magnitude arise that the elastic joint member 19 is compressed until the hub 11 comes into direct contact with the support bridge 14, abutting against the inner face of the walls 23 or 24. Owing to the cambered configuration of the hub the bridge is able, while retaining the clearance, to assume the angular position relative to the arm hub 11 which is caused by the turning movement of the chassis frame. There is no significant wear either on the hub 11 or the support bridge 14 and the connecting joint thus becomes durable and has a long service life.

The embodiment as illustrated and described is to be regarded as an example only and the design and arrangement of the hub 11, the support bridge 14 and the means to compress the elastic joint member 19 may be altered in a variety of ways within the scope of the appended claims. For instance the joint member 19 may be composed by two or several rubber sections. The support arm 8 may be directed forwards or rearwards in the longitudinal direction of the vehicle.

What I claim is:

1. An improved connection between the crane base of a truck-mounted loading crane and a transverse stay, called support bridge, mounted solidly on the vehicle chassis frame, comprising a support arm mounted on said crane base and extending in the longitudinal direction of said vehicle, said support arm engaging in said support bridge, the improvement comprising the free end of said support arm formed as a hub, a joint member made from some elastic material, such as rubber, secured in said support bridge and inserted into the hub end of said arm, a lateral groove formed in said support bridge, said arm end engaging in said groove with some clearance.

2. An improved connection according to claim 1, the improvement comprising a centrally located shoulder in said lateral groove, said joint member threaded on said shoulder, a compressing means arranged to compress said member on said shoulder.

3. An improved connection according to claim 2, the improvement comprising said hub having a slightly cambered configuration all allowing said hub to move inside said groove without touching the upper or lower walls of said groove.

4. An improved connection according to claim 1, the improvement comprising a raised portion on said support bridge, said groove arranged in said raised bridge portion.

* * * * *